United States Patent [19]

Beitler et al.

[11] 4,323,936

[45] Apr. 6, 1982

[54] RECORDING AND/OR REPRODUCING APPARATUS

[75] Inventors: Franz Beitler; Harald Neckamm, both of Vienna, Austria

[73] Assignee: U.S. Philips Corporation, New York, N.Y.

[21] Appl. No.: 148,644

[22] Filed: May 12, 1980

[30] Foreign Application Priority Data

Jun. 28, 1979 [AT] Austria .................................. 4550/79

[51] Int. Cl.³ ........................................... G11B 15/66
[52] U.S. Cl. ..................................... 360/85; 360/95; 360/130.21
[58] Field of Search .................. 360/85, 95–96.1, 360/130.21, 132

[56] References Cited

U.S. PATENT DOCUMENTS

| 4,045,822 | 8/1977 | Star | 360/85 |
| 4,138,699 | 2/1979 | Ura et al. | 360/85 |
| 4,258,399 | 3/1981 | Iijima et al. | 360/85 |

FOREIGN PATENT DOCUMENTS 53-29705 3/1978 Japan .

Primary Examiner—John H. Wolff
Attorney, Agent, or Firm—David R. Treacy

[57] ABSTRACT

Figure 1:
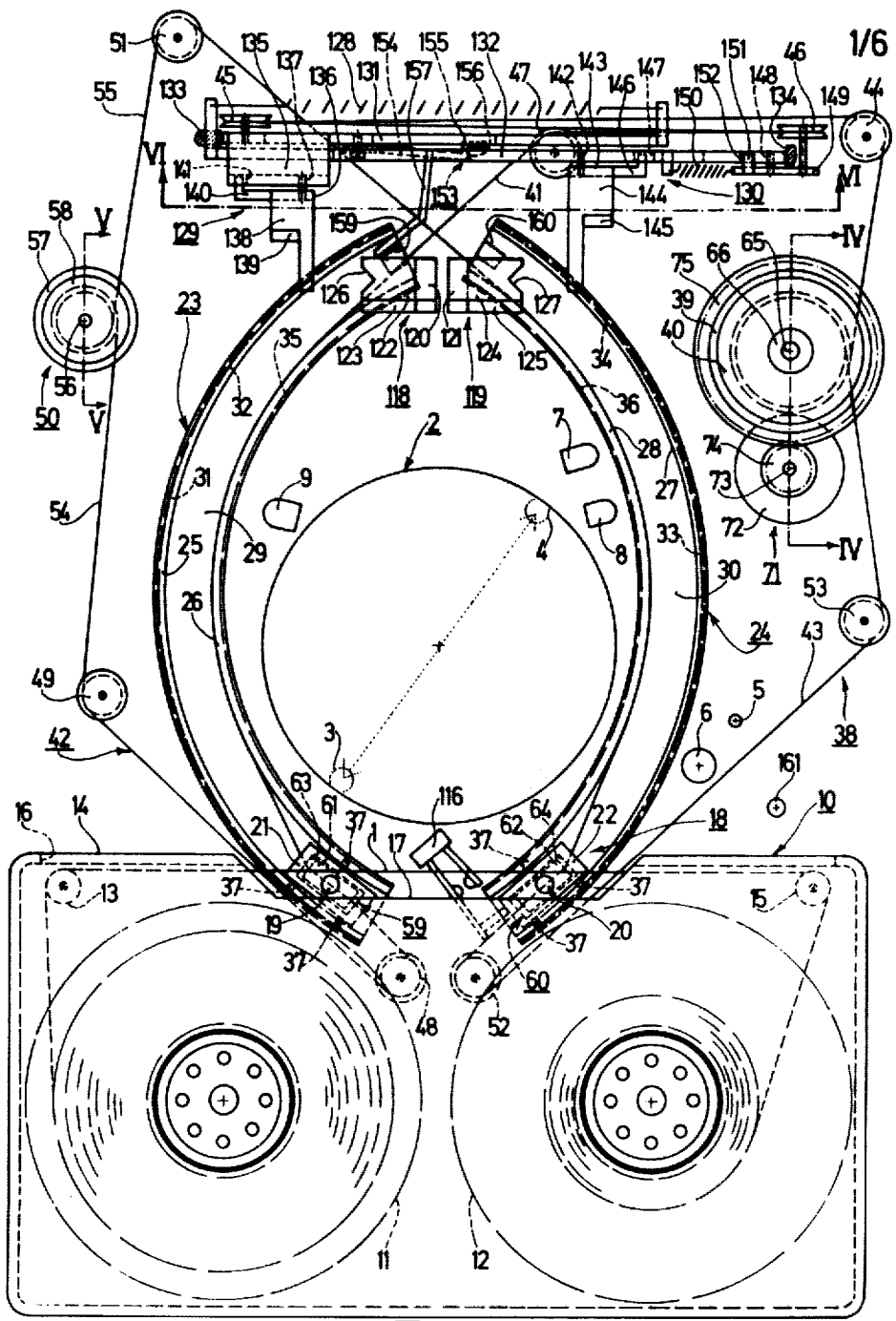

A magnetic tape recording and/or reproducing apparatus suitable for cooperation with a magnetic tape (1) accommodated in a cassette (10) is provided with a tape guide device (18) which comprises two substantially cylindrical tape guides (19, 20) each mounted on one of two movable supports (21, 22) for withdrawing a portion of the tube from the cassette and wrapping it around a tape guide drum (2). For moving the two supports there is provided a wire drive arrangement (38) which comprises two alternately rotatable wire drums (39, 40) and three wires (41, 42, 43), the first wire (41) passing from the first write drum (39) to the first support (21), the second wire (42) passing from the first support to the second support (22) and the third wire (43) passing from the second support to the second wire drum (40). For simultaneously moving the two supports from their rest positions to their operating positions the first wire drum (39) can be driven and for simultaneously moving the supports from their operating positions to their rest positions the second wire drum (40) can be driven. (FIG. 1).

14 Claims, 10 Drawing Figures

RECORDING AND/OR REPRODUCING APPARATUS

The invention relates to a recording and/or reproducing apparatus for a record carrier in the form of tape which is accommodated in a cassette which comprises at least one opening for the withdrawal of a portion of the record carrier from said cassette and which cassette can be supported on the apparatus, which apparatus is provided with a tape guide drum around whose circumferential surface can be wrapped the portion of the record carrier which has been withdrawn from the cassette, and with a tape guide device which is adapted to withdraw a portion of the record carrier from the cassette and wrap said portion of the record carrier around the tape guide drum, which tape guide device comprises two substantially cylindrical tape guides which are each arranged on an associated one of two movable supports in the apparatus, which supports are movable between a rest position, in which the tape guide engage behind the record carrier contained in the cassette at the location of the opening therein, and an operating position, in which the tape guides keep the portion of the record carrier which is moved by the tape guides when the supports are moved from their rest positions to their operating positions, wrapped around the tape guide drum, there being provided a wire drive arrangement for moving the two supports, which arrangement comprises a rotatable wire drum and two wires which each act on one of the two supports substantially in the direction of the movement of the support from its rest position to its operating position and one of which passes to the rotatable wire drum via a wire guide so as to be wound in by said wire drum. Such an apparatus is known from Japanese Patent Application Publication No. 29.705/1978.

In this known apparatus the supports for the tape guides take the form of levers which are pivotably journalled in the apparatus, one of two wires, which can jointly be wound onto a single rotatable wire drum, each time acting on said levers for moving said levers from their rest positions to their operating positions, and each time one return spring, which takes the form of an expander spring, acting on said levers for moving them from their operating positions back to their rest positions. When the wire drum is driven the two wires are wound onto said drum, the levers being pivoted against the action of the return springs. Since in this known apparatus the wires are jointly wound onto a single wire drum, it is not unlikely that the wires interfere with each other adversely, which may result in a non-uniform movement of the two supports and thus of the tape guides. This may result in the tape-like record carrier being subjected to a non-uniform load when it is withdrawn from the cassette. In the known apparatus the wires should be adapted to each other accurately in respect of their lengths in order to ensure that the two supports reach their operating positions at the same time. The use of return springs makes it necessary that when the wires are wound up in order to move the supports to their operating positions the drive means for the wire drum has to overcome the return force of the return springs, which demands an extra effort. The two return springs may exert different return forces, which again may result in the two supports being subjected to a non-uniform load. If return springs are employed, steps must be taken to ensure that said springs do not cause an abrupt return of the supports to their rest positions, because in the case of such an abrupt or jerky movement of the supports and the tape guides arranged thereon a correct return of the record carrier is not guaranteed.

It is the object of the invention to provide a recording and/or reproducing apparatus of the type mentioned in the preamble, which mitigates the said problems and in which the supports are moved from their rest positions to their operating positions and, conversely, from their operating positions to their rest positions, in a particularly uniform and reliable manner. To this end the invention is characterized in that the wire drive arrangement comprises two rotatable wire drums, for winding in one wire each, the first wire which acts on a first one of the two supports substantially in the direction of movement of said support from its rest position to its operating position passing to a first one of the two wire drums, in that the second wire which acts on the second one of the two supports substantially in the direction of movement of said support from its rest position to its operating position, passes to the first support and acts on this support substantially in the direction of movement thereof from its operating position to its rest position, in that a third wire passes from the second of the two wire drums to the second support and acts on this support substantially in the direction of movement thereof from its operating position to its rest position, and in that for the movement of the two supports from their rest positions to their operating positions the first wire drum can be driven and for the movement from their operating positions to their rest positions the second wire drum can be driven.

By providing two wire drums, which are adapted to wind in only one wire each, it is ensured that the two wires are each wound onto or unwound from one wire drum without adversely interfering with each other. This promotes a uniform winding or unwinding of the wires, so that winding or unwinding will not impair the movement of the supports. By interconnecting the two supports, which are essentially arranged in the apparatus so as to be movable independently of each other, by means of a wire, said supports are functionally coupled to each other in an advantageous manner, resulting in more precisely coordinated uniform movements of the two supports. These provisions ensure that the tape guides arranged on the supports perform smooth, coordinated and uniform movements; so that the tape-like record carrier, which in practice is very thin and therefore particularly vulnerable, is drawn from the cassette and subsequently wrapped around the tape guide drum, or alternatively returned into said cassette, in a particularly gentle manner.

In order to move the supports, which are essentially arranged in the apparatus so as to be movable independently of each other but which are functionally coupled to each other by the second wire, from their rest positions to their operating positions the first wire drum is driven and the first wire is wound onto this drum, the third wire being unwound from the second wire drum, which can then rotate substantially without being braked, so that this unwinding is effected practically without any counteraction. In order to move the supports from their operating positions to their rest positions, the second wire drum is driven in a reverse sense and the third wire is wound onto said drum, the first wire being unwound from the first wire drum, which can then also rotate substantially without being braked, so that this unwinding is also effected practically without any counteraction. Thus, for driving each of the two wire drums only one power source is required, which provides only the power necessary for moving the supports and for overcoming the friction effects, the movement of the supports being in no way effected against external return forces. Therefore, the desired result can be obtained with comparatively moderately dimensioned drive means for the wire drums, which in view of low costs and a low power consumption is to be regarded as an advantage.

The fact that the supports, which are functionally coupled to each other by means of a wire, are not only positively driven jointly into their operating positions by driving the first wire drum, but also positively driven into their rest positions by driving the second wire drum, furthermore has the advantage that it is always ensured that the two supports occupy their operating positions in the first-mentioned case and their rest positions in the second case. This arrangement allows accurate switching of any switches that have to be operated at the instant at which the supports reach their rest positions. Thus a switch may be operated to switch off the drive of the second wire drum.

As is known from the said Japanese Patent Application Publication No. 29.705/1978, the two supports may simply take the form of levers, which are pivotably journalled on a spindle which is rigidly mounted on the apparatus. However, it is found to be advantageous if each of the two supports takes the form of a sliding member and is movably guided along a guide between its rest position and its operating position and if the wire which acts on the first support passes along the guide for the first support and the wire which acts on the second support passes along the guide for the second support. The wires which act on the supports then require little additional space in the apparatus, because they extend along the guides themselves which were provided already for the supports. In this respect it is to be noted that in the case of guides having an arbitrary geometry, wires which pass along the guides for the supports are particularly suitable for driving the supports, because the wires can readily adapt to any geometry. If the guides for the supports are very long, actuation by means of wires has a further advantage, because a wire drive arrangement is suitable for covering greater path lengths, i.e., the lengths of the paths of travel of the two supports.

If the path lengths of the two supports between their rest positions and their operating positions are equal, the first, the second and the third wire are each moved over the same wire length when the two supports are moved. For certain reasons of design, for example, due to limited space being available, it may be necessary that the travels of the two supports should be different. In that case the second wire in its path between the two supports may be divided so as to form two separate wire sections, a pair of rotatable transmission drums being provided at the location of this division, which pair comprises two transmission drums of different diameter which are coaxial with each other and are connected to each other, the two wire sections each running onto an associated one of the two transmission drums and each being connected thereto, one of the wire sections running onto the associated transmission drum in the clockwise direction and the other in the counterclockwise direction, whilst in order to obtain different travels for the two supports the wire section which passes to the support having a greater travel is connected to the transmission drum having a greater diameter and the wire section which passes to the support having a smaller travel is connected to the transmission drum having a smaller diameter. Thus, by very simple means, a compensation is obtained for the different travels of the supports and thus of the wires acting on the supports, because as a result of the different diameters of the two transmission drums a greater length of wire is wound onto or unwound from one of said transmission drums than is unwound from or wound onto the other of said transmission drums respectively at the same time.

Between their connected ends, the wires may be guided by means of wire guides which, for example may take the form of rollers with circumferential grooves for engagement with the wires. In order to ensure that always a satisfactory guidance of the wires is obtained, the wires should always be sufficiently tensioned. In this respect it is found to be advantageous if the two wire drums are journalled in the apparatus so as to be coaxial with each other and are rotatable relative to each other, if the first wire and the third wire each run onto an arronated one of the two wire drums and is connected thereto, one of there two wires onto the associated wire drum in the clockwise direction and the other in the counterclockwise direction, if for winding in the wires connected to the two wire drums, said drums can be driven in opposite directions of rotation, and if there is provided a spring which acts between the two wire drums and urges the two wire drums relative to each other in opposite directions of rotation. Thus it may be ensured by means of the spring that between the wire drum a force is sustained of a magnitude such that the wires between the two wire drums are kept sufficiently taut. The spring may take the form of a flat spiral spring which is substantially coaxial with the wire drums. This provides a simple and compact construction, and such a spiral spring may have a flat spring characteristic so that comparatively large relative movements of the two wire drums are permitted, without the force exerted on the two wire drums by the spring increasing excessively.

The two wire drums may be driven by a common motor drive arrangement whose direction of rotation is reversible. This yields a low-cost and compact embodiment.

The drive means may comprise a d.c. motor. However, the drive arrangement may advantageously comprise a synchronous motor whose direction of rotation is reversible, which motor drives a rotatably journalled drive member which is coaxial with the two wire drums, and between the drive member and each of the two wire drums there being arranged a respective one of the two unidirectional coupling devices which, depending on the direction of rotation of the synchronous motor, establish a driving connection between the drive member driven by the synchronous motor and one or the other of the two wire drums. A synchronous motor has an essentially constant driving torque, which has the advantage that even if a support is blocked the driving torque does not increase, so that damaging or breaking of the wires is avoided. Moreover, when a synchronous motor is switched off it exhibits practically no run-out, so that braking of the wire drums driven by the synchronous motor by separate means after said motor has been switched off is not necessary.

For the unidirectional coupling devices it is for example, possible to use so-called freewheel mechanisms. However, it is found to be advantageous if each of the two unidirectional coupling devices comprises a driving projection which projects from the drive member, a coupling projection which projects from a disc which is rigidly connected to the respective wire drum, and a coupling disc which is coaxial with the drive member and which is journalled so as to be rotatable relative to said drive member and the wire drums, which coupling disc comprises a coupling projection for coupling said driving projection to the coupling projection on the disc which is rigidly connected to the respective wire drum. Such a coupling device is of a very simple construction and may operate in a troublefree and reliable manner.

For a simple control of the synchronous motor a control circuit may be provided, which comprises a manually-actuated first switching device which can be switched between two switching positions for connecting the synchronous motor to an a.c. supply voltage, in one of which switching positions the synchronous motor rotates in a first direction for driving the first wire drum so as to move the supports from their rest positions to their operating positions and in the other of which switching positions the synchronous motor rotates in a second direction, which is opposite to the first direction, for driving the second wire drum so as to move the supports from their operating positions to their rest positions, the control circuit further comprising a second switching device which can be actuated when the supports are in their operating positions, which device disconnects the synchronous motor from the a.c. supply voltage and connects it to a d.c. holding voltage when the supports are in their operating positions. By connecting the synchronous motor to a d.c. holding voltage when the supports are in their operating positions said motor is substantially held stationary, so that the first wire drum is also held stationary and thereby ensures that the supports are retained in their operating positions. Thus, a separate latching device for latching the first wire drum after the supports have reached their operating positions may be dispensed with.

If the two supports are in their operating positions, the two tape guides arranged on the supports are also in their operating positions. To achieve an exact tape path it is essential that the tape guides then occupy an accurately defined position. For positioning the two tape guides when the supports are in their operating positions there may be provided one positioning device for each tape guide and when the supports are in their operating positions the tape guide may each be urged into the respective positioning device by means of a separate pressure device which is movable against the action of a return spring from a disengaged position to an engaged position, and for moving each pressure device to its engaged position a wire guide roller may be rotatably journalled on each pressure device, the first wire passing round each wire guide roller so as to urge the respective pressure device in the direction of its engaged position, and for each pressure device there may be provided a separate disengagable latching device which prevents the pressure device from moving to its engaged position when the respective support is out of its operating position and which is disengaged when the respective support is in its operating position. In this way the wire drive arrangement provided for moving the support may also be used for moving the pressure devices, so that a separate drive arrangement for the pressure devices may be dispensed with.

For a simple construction the two pressure devices may each comprise a pressure slide, the two slides being movable parallel to each other, and on each slide an essentially U-shaped pressure member being pivotably journalled for cooperation with the respective tape guide, there being provided a single disengagable latching device which is common to the two pressure devices and acts between the two pressure slides. In this way a compact arrangement may be obtained.

One of the two pressure devices may comprise a switching lever which is pivotably journalled on said device, which lever under the influence of a retaining spring is retained against a stop on said one of the pressure devices, and on which lever the wire guide roller on said one of the pressure devices is rotatably journalled, the switching lever, when said one of the pressure devices is in its engaged position, being kept in a switching position by cooperation between the first wire and said wire guide roller, in which position the switching lever is disengaged from the stop against the action of the retaining spring and the switching lever being coupled to the second switching device of the control circuit for the synchronous motor, which when the switching lever is in its switching position ensures that the synchronous motor remains connected to its d.c. holding voltage. In this way it is ensured that the synchronous motor, which is connected to the d.c. holding voltage and which is thus held stationary, not only keeps the supports in their operating positions but also keeps the pressure devices in their engaged positions, so that separate retaining devices for retaining the pressure devices in their engaged positions may be dispensed with.

The connections between the supports and the wires may, for example, be established by permanent clamping connections. However, it is found to be advantageous to provide detachable couplings. In this way it may be ensured that the supports can be mounted in a simple manner and may be removed, for example, for the purpose of cleaning. For the detachable coupling a pin-and-slot-connection may be used. This pin-and-slot-connection may, for example, comprise a lug which is attached to the wire and a pin which projects from the support and which engages with the lug. Alternatively, a coupling element may be rigidly connected to the wire and the support may be formed with a coupling recess, in which the coupling element engages.

In this respect it is found to be advantageous in an apparatus in which, when the supports are in their operating positions, the two tape guides can be positioned with the aid of positioning devices into which the tape guides are pressed by means of pressure devices, if the detachable coupling between each wire and the respective support has some lost motion relative to the support in order to allow the respective tape guide to be positioned freely when the support is in its operating position. This ensures that the tape guides arranged on the supports can be positioned without being influenced or impeded by the wires which act on the supports under tension.

The invention will be described in more detail with reference to the drawings, which show two embodiments to which the invention is not limited. In the drawings:

FIG. 1 is a schematic plan view showing the parts which are relevant to the invention, of a recording and/or reproducing apparatus for a record carrier in the form of a tape which is accommodated in a cassette, which apparatus for wrapping the record carrier around a tape guide drum comprises two tape guide pins each arranged on a support in the form of a sliding member, the two sliding members, which are movable between a rest position and an operating position by means of a wire drive arrangement being shown in their rest position.

Figure 2:
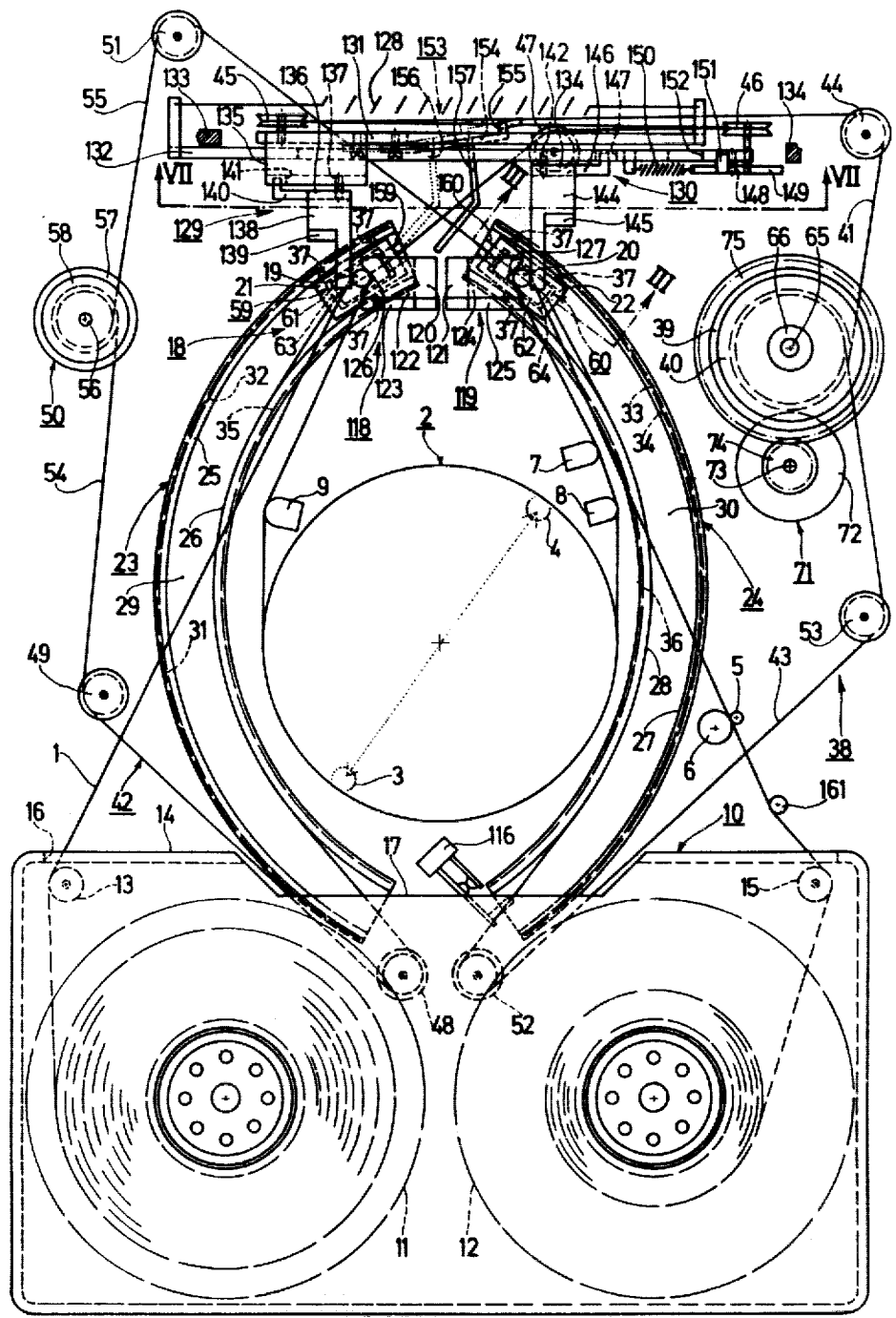
Figure 3:
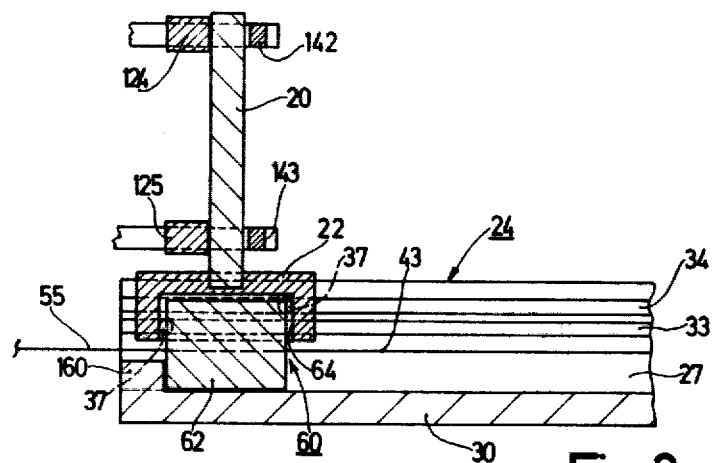
Figure 4:
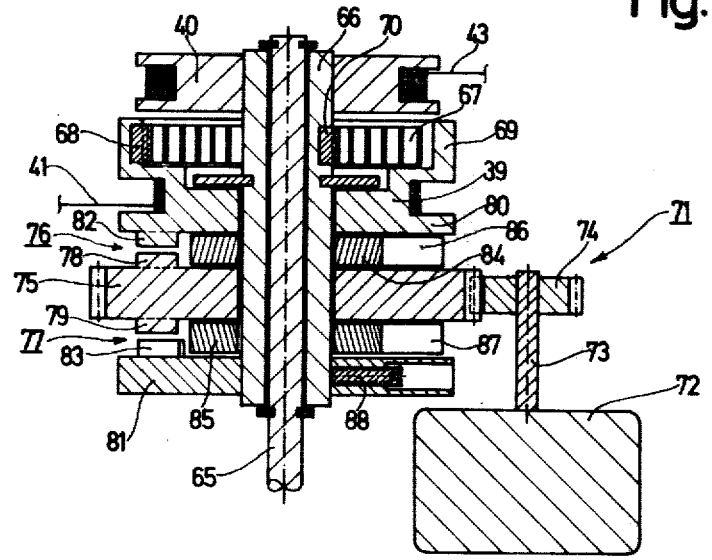
Figure 5:
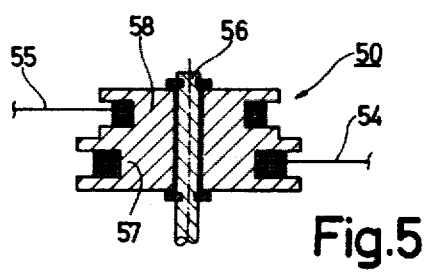
Figure 6:
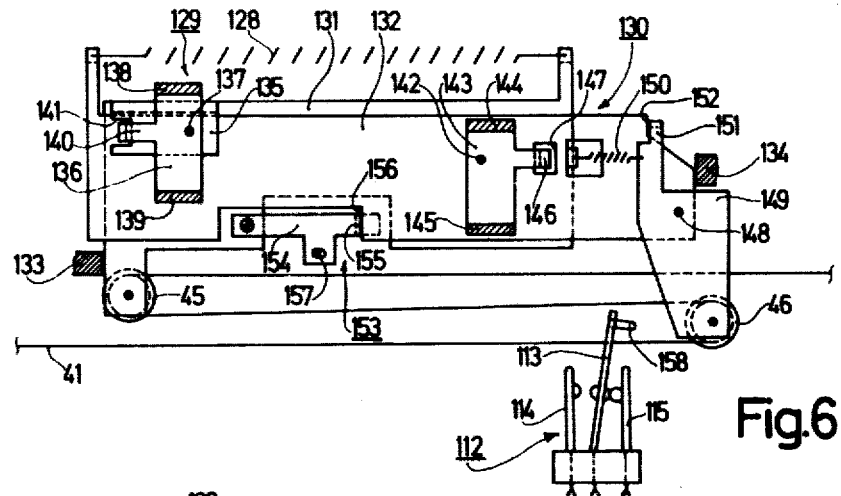
Figure 7:
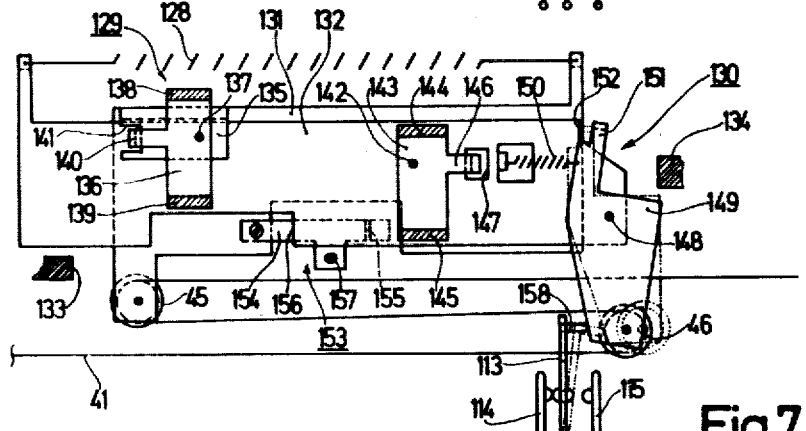

FIG. 2 shows the apparatus of FIG. 1 with the sliding members in their operating positions, FIG. 3 is a cross-section through one of the two sliding members in its operating position, taken on the line III—III in FIG. 2, FIG. 4 is a cross-section through a detail of the apparatus in accordance with FIGS. 1 and 2 taken on the line IV—IV in FIG. 1, FIG. 5 is a cross-section through a detail of the apparatus of FIGS. 1 and 2 on the line V—V in FIG. 1, FIG. 6 is a cross-section through a detail of the apparatus of FIGS. 1 and 2 taken on the line VI—VI in FIG. 1, FIG. 7 shows the same detail as FIG. 6 in a cross-section taken on the line VII—VII in FIG. 2.

Figure 8:
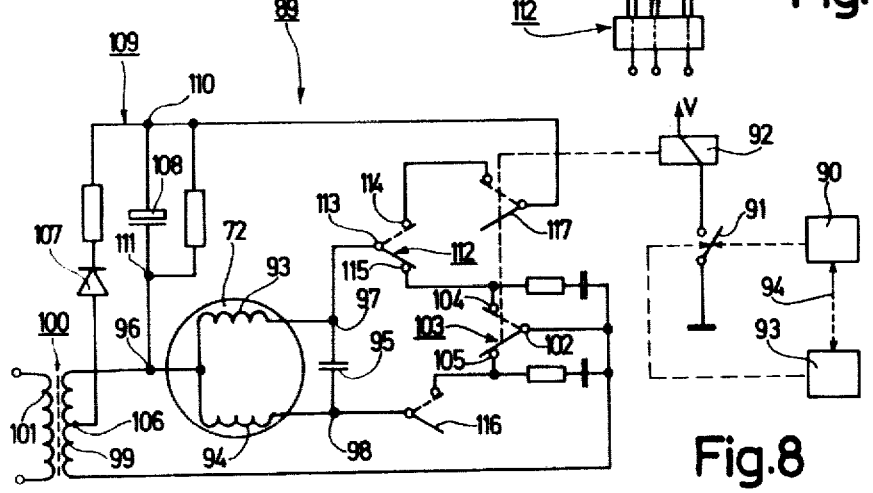
Figure 9:
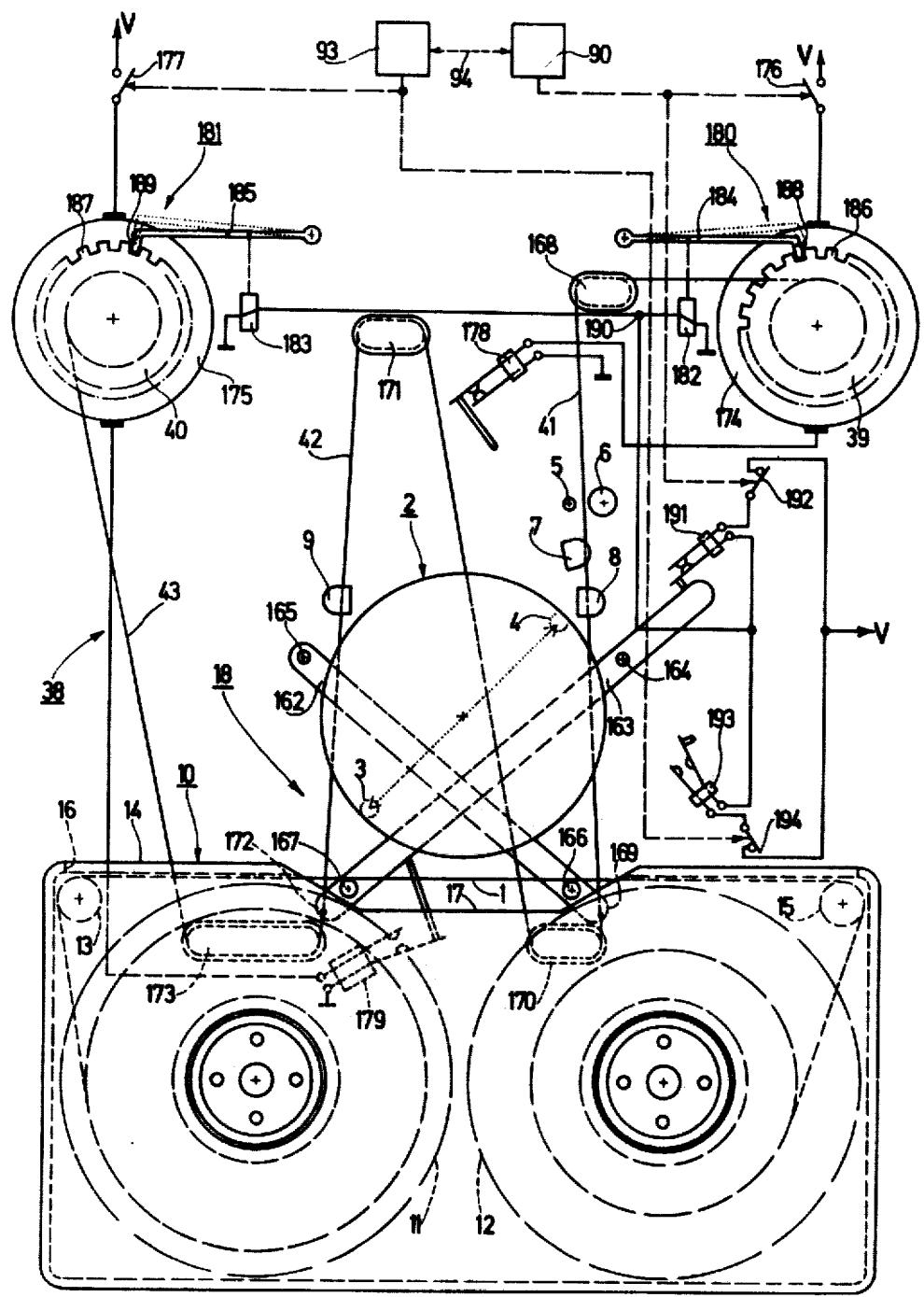
Figure 10:
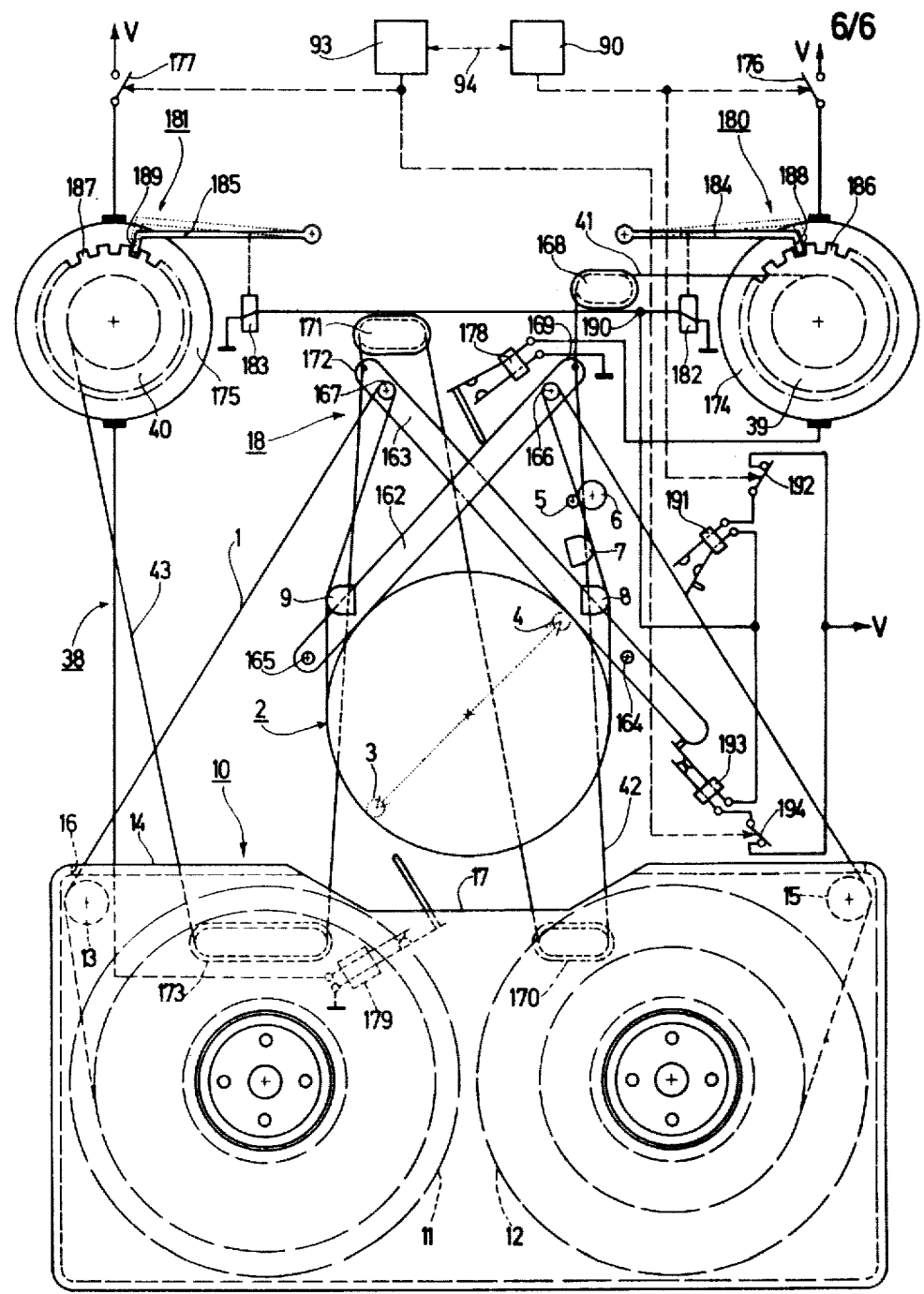

FIG. 8 represents a control circuit for a synchronous motor employed in the apparatus of FIGS. 1 and 2, FIG. 9 is a schematic plan view showing the parts which are relevant for the invention, of an other recording and/or reproducing apparatus, in which the tape guides take the form of rollers and the supports for the tape guide rollers take the form of pivotable levers, which are shown in their rest positions, and FIG. 10 shows the apparatus of FIG. 9 with the levers in their operating positions.

FIGS. 1 and 2 schematically represents a recording and/or reproducing apparatus which is adapted to record and/or reproduce wide-band signals, in particular television signals, on a magnetizable record carrier 1 in the form of a magnetic tape, which is hereinafter referred to as "a tape". The apparatus comprises an only schematically represented tape guide drum 2, around whose circumferential surface the tape 1 can be wrapped over an angle of essentially 180° along a helical path. Inside the tape guide drum 2 two rotatable magnetic heads 3 and 4 are arranged which are schematically represented by dotted lines, and which cooperate with the tape 1 which has been wrapped around the drum 2, through a gap (not shown) which is formed in the drum and which divides the drum 2 into two drum sections. The magnetic heads scan the tape during its transport in accordance with tracks which extend obliquely relative to the longitudinal direction of the tape, the magnetic heads being adapted to record or reproduce television signals on the tape. For the transport of the tape 1 which has been wrapped around the tape guide drum 2 the apparatus comprises a tape drive capstan 5, against which the tape can be pressed by means of a pressure roller 6 which is arranged in the apparatus so as to be movable in a manner not shown.

The apparatus furthermore comprises a stationary magnetic head 7, by means of which a track which extends along the tape 1 in the longitudinal direction thereof can be scanned and an audio signal associated with the television signal can be recorded or reproduced. In addition to the magnetic head 7 there is provided a further stationary magnetic head 8, by means of which the same track can be scanned as is scanned by the magnetic head 7 and which is adapted to erase audio signals recorded in this track. A further stationary magnetic head 9 has been provided for simultaneously erasing the television signals recorded in the oblique tracks and the associated audio signal recorded in a longitudinal track.

As can be seen in FIG. 1, the tape 1 is accommodated in a rectangular cassette 10 which can be supported on the apparatus, which cassette comprises two major walls and four side walls and which contains two rotatably journalled and rotatably drivable reels 11 and 12 which are arranged adjacent one another and on which the tape 1 is wound. The tape 1 is passed from the reel 11, which serves as supply reel, to a first guide roller 13, from there along the side wall designated 14 to a guide roller 15, and then to the reel 12, which serves as a take-up reel. The cassette 10 is formed with an opaning 16 in the side wall 14, through which opening a portion of the tape 1 can be withdrawn from the cassette to be wrapped around the tape guide drum 2. In its middle the opening 16 continues as a trough-shaped recess 17 in each major wall of the cassette.

In order to withdraw the tape from the cassette 10 and wrap it around the tape guide drum 2, and at the same time bring the tape into operative contact with the magnetic heads 7, 8 and 9 and with the capstan 5, the apparatus is provided with a tape guide device 18, which comprises two substantially cylindrical tape guides 19 and 20 in the form of pins. It is obvious that the tape guides may alternatively take the form of rollers. The tape guide pins 19 and 20 are each arranged on one of two movable supports 21 and 22 in the apparatus. The supports 21 and 22 are movable between a rest position, shown in FIG. 1, in which the tape guide pins 19 and 20 are located inside the trough-shaped recesses 17 in the major walls of the cassette 10 and engage behind the tape 1 accommodated in the cassette at the location of the opening 16 in said cassette, and an operating position, shown in FIG. 2, in which the tape guide pins 19 and 20 keep the tape, which is pulled out of the cassette by the pins when the supports are moved from their rest positions to their operating positions, wrapped around the tape guide drum 2.

In the present case each of the two supports 21 and 22 consists of a sliding member which has the form of a substantially rectangular block and which is movably guided between its rest position and its operating position along a guide 23 and 24 respectively for said members. For reasons of economy of space the guide 23 for the sliding member 21 has a greater curvature and a greater length than the guide 24 for the sliding member 22, so that the sliding member 21 covers a greater path length between its rest position and its operating position than the sliding member 22. The guides 23 and 24 are constituted by guide channels of essentially U-shaped cross-section which each comprise two side walls 25, 26 and 27, 28 respectively and a bottom wall 29 and 30 respectively, as can be seen in FIG. 3. In the side walls 25, 27 respectively, of each guide are formed two guide slots 31, 32 and 33, 34 respectively, which are situated above each other, and in each of the side walls 26 and 28 one guide slot 35 and 36 respectively is formed. The free ends of pins 37 arranged three on each sliding member 21 and 22 project into the guide slots 31 to 36 and slide in the guide slots when the sliding members are moved. In this way the sliding members are movably guided in the guide channels, each supported at 3 points. In this respect it is to be noted that by a suitable geometry of the guide channels and the guide slots the sliding members 21 and 22 can be given any desired spatial movement.

For moving the two sliding members 21 and 22 between their rest positions and their operating positions there is provided a wire drive arrangement 38. The wire drive arrangement comprises two rotatable wire drums 39 and 40 and two wires 41 and 42 which each act on one of the two sliding members substantially in the direction of movement of the sliding member 21 or 22 from its rest position to its operating position. The wire 41, which acts on the first sliding member 21 substantially in the direction of movement of said member from its rest position to its operating position, passes to the first wire drum 39. The second wire 42, which acts on the second sliding member 22 essentially in the direction of movement of said member from its rest position to its operating position, passes to the first sliding member 21 and acts on this sliding member substantially in the direction of movement of said member from its operating position to its rest position, so that the two sliding members, which are essentially guided independently of each other, are coupled to each other by means of the second wire 42. A third wire 43 passes from the second wire drum 40 to the second sliding member 22 and acts on this sliding member substantially in the direction of movement of said member from its operating position to its rest position. The coupling of the two sliding members by means of the second wire ensures that the two sliding members perform an exactly coordinated movement. As is apparent from FIGS. 1, 2 and 3, the wires 41 and 42, which act on the first sliding member 21 pass partly along the guide 23 for the first sliding member 21, and the wires 42 and 43, which act on the second sliding member 22, pass partly along the guide 24 for the second sliding member 22. In this way the space provided for guiding the sliding members is at the same time employed for guiding the wires, so that considerable space is saved. Moreover, because of their flexibility, the wires readily adapt themselves to any geometry of the guides 23 and 24.

The first wire 41 passes from the first drum 39 via a first wire guide roller 44, a second wire guide roller 45, a third wire guide roller 46 and a fourth wire guide roller 47 to the guide 23 for the first sliding member 21 and, as stated previously along this guide to the first sliding member 21. The second wire 42 passes from the first sliding member 21, along the guide 23 for the first sliding member 21, as stated previously, to a fifth wire guide roller 48 and thence via a sixth wire guide roller 49 to a pair of rotatable transmission drums 50. From the pair of transmission drums 50 the second wire passes via a seventh wire guide roller 51 to the guide 24 for the second sliding member 22 and, as stated previously, along this guide to the second sliding member 22. The third wire passes from the second sliding member 22, as stated previously, along the guide 24 for the second sliding member 22 to an eighth wire guide roller 52 and thence via a ninth wire guide roller 53 to the second wire drum 40.

The second wire 42 extends between the two sliding members 21 and 22 so that two separate wire sections 54 and 55 are formed. At the location where the second wire 42 is divided the pair of transmission drums 50 is arranged, which is shown in more detail in FIG. 5. The pair of transmission drums 50 comprises two drums 57 and 58 which are coaxial with each other, which are rotatable about a fixed spindle 56 in the apparatus, and which are rigidly coupled to each other, said drums having different diameters. The two wire sections 54 and 55 run in opposite directions onto the two drums 57 and 58 respectively and are connected to the respective drums. In the present case the wire section 54 runs onto the drum 57 in the anti-clockwise direction (as viewed in FIGS. 1 and 2) and the wire section 55 runs onto the drum 58 in the clockwise direction. Thus the wire section 54, which acts on the first sliding member 21 which has a greater travel, is connected to the drum having the greater diameter and the wire section 55, which acts on the second sliding member 22 which has a smaller travel, is connected to the drum 58 having the smaller diameter. When the sliding members are moved the drum 57 takes up or pays out a greater wire length than is paid out or taken up by the drum 58. The diameters of the two drums have been selected so that the difference between the wire length wound on one drum and the wire length which is simultaneously unwound from the other drum exactly corresponds to the difference in travel of the two sliding members between their rest positions and operating positions, thus simply compensating in a simple manner for the different travels of the two sliding members, which are coupled to each other by means of the second wire.

It is to be noted that in the present case the first wire 41 and the wire section 54 belong to a continuous length of wire, which passes from the first wire drum 39 to the drum 57 of the pair of transmission drums 50 and which acts on the first sliding member 21, and that the wire section 55 and the third wire 43 belong to a further continuous length of wire, which passes from the drum 58 of the pair of transmission drums 50 to the second wire drum 40 and which acts on the second sliding member 22. Obviously, the first wire 41, the second wire 42 and the third wire 43 may all belong to a single continuous length of wire. If required, it is also possible that the first wire 41, the second wire 42 and the third wire 43 may be formed by separate lengths of wire.

The wires 41, 42, 43 act on the supports formed by the sliding members 21 and 22, as can be seen in FIGS. 1, 2 and 3, via detachable couplings 59 and 60, which in the present case have some free motion. The wires 41, 42 and 43 are rigidly connected to coupling attachments 61 and 62 having the form of substantially rectangular blocks, for example, by pressing there coupling attachments onto the wires. The coupling attachments 61 and 62 rest on the bottom walls 29 and 30 of the guides 23 and 24 respectively and slide on these walls when the sliding members are moved. The sliding members 21 and 22 each have a coupling recess 63 and 64 respectively, in which the respective coupling attachment engages with play so that it has some lost-motion relative to the respective sliding member. In this way a very simple coupling is obtained between the wires and the sliding members. A detachable coupling as described in the foregoing has the advantage that the sliding members can be mounted and removed very simply, because this can be effected by simply fitting the sliding members onto the coupling attachments, the coupling attachments being slightly pulled out of the guides for the sliding members and, after the sliding members have been fitted onto the coupling attachments, the pins 37 on the sliding members being slid into the guide slots 31 to 36. Because of the lost motion of the detachable couplings the sliding members can follow the movements imposed by the guide slots, without the sliding members being impeded by the wires which act on these members. Moreover, because of the lost motion of the detachable couplings, the tape guide pins can be positioned exactly when the sliding members are in their operating positions, without being influenced and impeded by the wires, which act on the sliding members with tension, as is to be described hereinafter.

For moving the two sliding members 21 and 22 from their rest positions to their operating positions, the first wire drum 39 can be driven in a clockwise direction (as viewed in FIGS. 1 and 2) and for moving the two sliding members from their operating positions to the rest positions the second wire drum 40 can be driven in an anti-clockwise direction. When the first wire drum 39 is driven the first wire 41 is wound onto said drum, the first sliding member 21 being pulled from its rest position to its operating position by the first wire 41 which acts on said member. The second sliding member 22, which is coupled to the first sliding member 21 via the second wire 42, is then also pulled from its rest position to its operating position, the third wire 43, which acts on the second sliding member 22, then being unwound from the second wire drum 40. When the second wire drum 40 is driven, the process is reversed, the two sliding members 21 and 22 being jointly pulled from their operating positions into their rest positions.

As can be seen from FIGS. 1, 2 and 4, the two wire drums 39 and 40 are journalled in the apparatus coaxially with each other and are rotatable relative to each other. For this purpose a sleeve 66 is slid onto a spindle 65 which is rigidly mounted in the apparatus. The first wire drum 39 is rotatable around the sleeve 66 while the second wire drum 40 is rigidly connected to the sleeve. The first wire 41 and the third wire 43 run in opposite directions onto the two wire drums 39 and 40 respectively, i.e. the first wire 41 runs onto the first wire drum 39 in a clockwise direction (as viewed in FIGS. 1 and 2) and is connected thereto and the third wire 43 runs onto the second wire drum 40 in an anti-clockwise direction and is connected to said last-mentioned drum. Between the two wire drums 39 and 40, which can be driven in opposite directions of rotation so as to wind in the respective wires connected thereto, there is provided a spring 67 which urges the two wire drums 39 and 40 in opposite directions of rotation. The spring takes the form of a flat spiral spring which is substantially coaxial with the wire drums 39 and 40. The outer end 68 of the spiral spring is attached to a hollow-cylindrical coaxial extension 69 of the first wire drum 39 and the inner end 70 of the spiral spring is attached to the sleeve 66, which is rigidly connected to the second wire drum 40. In this way the two wire drums 39 and 40 are so biassed relative to each other by the tension spring 67 that the wires 41, 42 and 43 which extend between the two wire drums are always kept sufficiently taut.

The two drums 39 and 40 also have different diameters, the first wire drum 39, onto which the first wire 41 runs, having a greater diameter than the second wire drum 40, onto which the third wire 43 runs. The diameters have been selected in conformity with the different travels of the two sliding members, so that although different lengths of the first wire 41 and the third wire 43 are wound in and paid out by the respective drums, because of the different travels of the two sliding members 21 and 22, no relative movement occurs between the two wire drums during the movement of the sliding members. Thus, when the two sliding members are moved, the force of the spring 67 acting between the two wire drums will not change, so that the influence of the spring on the wire drums and thus on the wires extending between the two wire drums will neither vary during the movement of the sliding members.

As stated previously, the two wire drums 39 and 40 can be driven in opposite directions for moving the sliding members 21 and 22 from their rest positions to their operating positions and in the reverse direction. For driving the two coaxial wire drums 39 and 40 there is provided a common motor drive means 71, whose direction of rotation is reversible. The drive means 71 comprises a synchronous motor 72 whose direction of rotation is reversible, which motor via a gear wheel 74 mounted on the motor shaft 73, drives a drive member 75 in the form of a gear wheel which is rotatable around the sleeve 66, coaxially with the two wire drums 39 and 40. Between the gear wheel and each of the two wire drums 39 and 40 there is provided a unidirectional coupling device 76 and 77 respectively, which, depending on the direction of rotation of the synchronous motor, constitutes a driving connection between the gear wheel 75 driven by said motor, and a respective one of the two wire drums 39 and 40. In this way, the two wire drums are driven in a simple manner by a single drive means, which is cheap and space-saving.

Each of the two unidirectional coupling devices 76 and 77 respectively comprises a driving projection 78 and 79 respectively, which projects axially from the gear wheel 75, eccentrically thereof a coupling projection 82 and 83 respectively, which projects axially from a disc 80 and 81 respectively eccentrically thereof, which discs are rigidly connected to the respective wire drums 39 and 40, and a coupling disc 84 and 85 respectively, which is coaxial with the gear wheel 75 and is rotatable around the sleeve 66 and relative to the gear wheel 75 and the wire drums. Each of the two coupling discs 84 and 85 is provided with a radially projecting coupling projection 86 and 87 respectively, for coupling the driving projection 78 and 79 respectively to the coupling projection 82 and 83 respectively. In the present case the disc 80, which is rigidly connected to the first wire drum 39, from which disc the coupling projection 82 projects, is constituted directly by a flange on the wire drum. The disc 81, which comprises the coupling projection 83, is slid onto the sleeve 66 and secured to the sleeve by means of a screw 88. Thus, by loosening screw 88 and turning the disc 81, the position of the disc 81 and the coupling projection 83 be adjusted in a simple manner relative to the other parts of the drive arrangement 71. Adjustment is effected so that the two coupling projections 82 and 83 occupy a position relative to each other such that, depending on the direction of rotation of the gear wheel 75 a drive connecting is established with only one of the two discs 80 and 81, which are rigidly connected to the wire drums 39 and 40, and the gear wheel 75 via the coupling discs 84 and 85. This is effected so that in the case of rotation of the gear wheel 75 in a clock-wise direction a connection is obtained with the first wire drum 39 and in the case of a rotation of the gear wheel 75 in an anti-clockwise direction a connection is obtained with the second wire drum 40.

For controlling the synchronous motor 72 there is provided a control circuit 89 which is shown in FIG. 8. In order to start the movements of the sliding members 21 and 22 from their rest positions to their operating positions the apparatus comprises a manually actuated button 90, which is automatically locked in its on-position and upon whose actuation a switch 91 is closed which is included in the circuit of an electromagnet 92 which is connected to a d.c. supply voltage V, so that when the button 90 is actuated the magnet 92 is energized. In order to start the movements of the sliding members from their operating positions to their rest positions, the apparatus also comprises a manually-actuated button 93, which is automatically locked in its on-position and upon whose actuation the switch 91 is opened, so that when the button 93 is actuated the magnet 92 is not energized. The two buttons 90 and 93 are constructed so that upon actuation of one of the two buttons the other button, if actuated, is released from its on-position, as is symbolically indicated by the broken line 94.

FIG. 8 shows diagrammatically two exciter coils 93 and 94 of the synchronous motor 72, which coils at one end are directly connected to each other and as the other end are connected to each other via a phase-shifting capacitor 95. The rotor, not shown, in this case comprises a permanent magnet with a predetermined member of poles. For driving the synchronous motor an a.c. supply voltage can be applied between terminal 96 and, depending on the desired direction of rotation of the synchronous motor 72, one of the two terminals 97 and 98 of the synchronous motor, the a.c. supply voltage being applied to the other of the two terminals 97 or 98 via the phase-shifting capacitor 95. The a.c. supply voltage is taken from the secondary 99 of a transformer 100, the primary 101 of which is connected to a power supply mains. One end of the secondary is connected directly to the terminal 96 and the other end is connected to the main contact 102 of a first switching device 103, which takes the form of a simple change-over switch. The first switching device serves for connecting the synchronous motor to the a.c. supply voltage, the first contact 104 of the switching device 103 being connected to the terminal 97 and the second contact 105 to the terminal 98 of the synchronous motor. Between each of the two contacts 104 and 105 and the main contact 102 a resistor-capacitor series connection is included for spark suppression. The first switching device 103, as is indicated by the dashed line in FIG. 8, can be actuated by the electromagnet 92, the main contact 102 being connected to the contact 104 when the electromagnet is energized and the main contact 102 being connected to the contact 105 when the electromagnet is not energized.

When the electromagnet 92 is energized by actuation of the button 90, the first switching device 103 is set to the switching position represented by a broken line in FIG. 8, in which the synchronous motor 72 is connected to the a.c. supply voltage with its terminal 97 via the first switching device 103 and, for driving the first wire drum 39 in order to move the sliding members 21 and 22 from their rest positions to their operating positions, rotates in a first direction of rotation, namely in the present case in an anti-clockwise direction (as viewed in FIGS. 1 and 2). If the electromagnet 92 is de-energized by actuation of the button 93, the first switching device 103 is set to the switching position represented by a solid line in FIG. 8, in which the synchronous motor is connected to the a.c. supply voltage with its terminal 98 via the first switching device 103 and for driving the second wire drum 40 in order to move the sliding members from their operating positions to their rest positions, rotates in a direction of rotation opposite to the first direction of rotation, i.e. in the present case in a clockwise direction.

As can be seen in FIG. 8, the secondary winding 99 of the transformer 100 has a tapping 106, which is connected to a rectifier circuit 109, which comprises a diode 107 and a charging capacitor 108, for rectifying the alternating voltage appearing on the tapping 106. In this way a d.c. holding voltage for the synchronous motor 72 is obtained on the terminals 110 and 111 of the charging capacitor 108, by means of which as soon as it is applied to the synchronous motor said motor is braked. The terminal 111 of the charging capacitor 108 is connected directly to the terminal 96 of the synchronous motor 72. For applying the d.c. holding voltage to the synchronous motor, the control circuit 89 comprises a second switching device 112 in the form of a simple change-over switch, whose main contact 113 is connected to the terminal 97 of the synchronous motor, whose first contact 114 is connected to the terminal 110 of the charging capacitor 108, and whose second contact 115 is connected to the first contact 104 of the first switching device 103. The second switching device 112, as will be described in more detail hereinafter, can then be actuated only when the sliding members 21 and 22 are in their operating positions. If the sliding members do not occupy their operating positions, the second switching device 112 is in a switching position in which its main contact 113 is connected to its second contact 115, the synchronous motor 72 when being connectable to the a.c. supply voltage via the second switching device 112 and the first switching device 103 in order to move the sliding members from their rest positions to their operating positions. As soon as the sliding members occupy their operating positions, the second switching device 112 is in that switching position in which its main contact 113 is connected to the first contact 114, the synchronous motor 72 then being connected to the d.c. holding voltage and thus being braked.

The control circuit 89 furthermore comprises a switch 116, which is included in the connection between the second contact 105 of the first switching device 103 and the terminal 98 of the synchronous motor. Via this connection the synchronous motor 72 can receive the a.c. supply voltage for driving said motor in a clockwise direction, so as to move the sliding members from their operating positions to their rest positions. The switch 116 can then be actuated only when the sliding members 21 and 22 are in their rest positions. In the present case the switch 116, as can be seen in FIGS. 1 and 2, can be actuated by the sliding member 22, which opens the switch 116 as soon as it assumes its rest position. In its open position, the switch 116 disconnects the a.c. supply voltage from the synchronous motor, so that the synchronous motor is no longer driven in the clockwise direction, to move the sliding members from their operating positions to their rest positions, as soon as the sliding members have reached their rest positions. In FIG. 8 the switch 116 is represented by a broken line with the sliding members in their rest positions, i.e. in its closed switching position, and by a full line with the sliding members in their rest positions, i.e. in its open switching position.

Furthermore, the control circuit 89 comprises a switch 117, which in a similar way to the first switching device 103 can be actuated by the electromagnet 92 and is included in the connection between the first contact 114 of the second switching device 112 and the terminal 110 of the charging capacitor 108. If the electromagnet 92 is energized upon actuation of the button 90, in order to move the sliding members from their rest positions to their operating positions, the switch 117 is in its closed switching position represented by a broken line in FIG. 8. Thus, when the sliding members are in their operating positions, the second switching device 112 being in the switch position which is also represented by a broken line in FIG. 8, the d.c. holding voltage can be applied to the synchronous motor 72 via the switch 117 and the second switching device 112, so that the synchronous motor is then braked. If the electromagnet 92 is de-energized by actuating the button 93 in order to start the movement of the sliding members from their operating positions to their rest positions, the switch 117 is in its open switch position represented by a full line in FIG. 8, so that the d.c. holding voltage is then no longer applied to the synchronous motor 72 and consequently the synchronous motor is no longer braked.

As can be seen in FIGS. 1 and 2, the apparatus is provided with a positioning device 118 and 119 for each tape guide pin for positioning the two tape guide pins 19 and 20 when the sliding members 21 and 22 are in their operating positions. The positioning devices 118 and 119 each comprise a U-shaped block 120 and 121 respectively, each block having a V-shaped positioning groove 126 and 127 respectively in the free end of each of its limbs 122, 123, and 124, 125 respectively. When the sliding members are in their operating positions the tape guide pins 19 and 20 are each pressed into the positioning grooves 126, 127 of the positioning device 118 and 119 respectively, against the action of a return spring 128 by a pressure device 129 and 130 respectively which can be set from a disengaged position to an engaged position.

Each pressure device 129 and 130 comprises a pressure slide 131 and 132 respectively, the two pressure slides being arranged in the apparatus so as to be movable parallel to each other in a manner not shown. The return spring 128, which tends to keep the two pressure devices in their disengaged positions, simply acts directly on each of the two pressure slides 131 and 132 in a corresponding manner. The disengaged positions of the two pressure devices, which are shown in FIGS. 1 and 6, are defined by two fixed stops 133 and 134 on the apparatus for the pressure slides 131 and 132, the pressure slide 131 being held in the disengaged position against the stop 133 under the influence of the return spring 128 and the pressure slide 132 being held in the disengaged position of the pressure device 130 against the stop 134 under the influence of the return spring 128. The engaged positions of the two pressure devices, which are shown in FIGS. 2 and 7, are automatically obtained when the pressure devices press the tape guide pins into the positioning devices.

The pressure slide 131 comprises an L-shaped bearing-bracket 135, on which an essentially U-shaped pressure member 136 is journalled to pivot about an axis 137, which pressure member, when the sliding member 21 is in its operating position, is adapted to press with its limbs 138 and 139 the tape guide pin 19 into the positioning groove 126 of the positioning device 118. The pressure member 136 comprises an L-shaped finger 140, whose hooked free end extends into a recess 141 in the bearing bracket 135, so that the pivoting range of the pressure member 136 is effectively limited.

The pressure slide 132 also comprises an essentially U-shaped pressure member 143, which is pivotable about an axis 142 and which with its limbs 144 and 145 is adapted to press the tape guide pin 20 into the positioning groove 127 of the positioning device 119 when the sliding member 22 is in its operating position. The pressure member 143 comprises an L-shaped finger 146, whose hooked free end projects into an aperture 147 in the pressure slide 132, so that the pivoting range of the pressure member 132 is effectively limited.

In the present case the pressure device 130 comprises a switching lever 149 which is journalled on the pressure slide 132 of said device to pivot about an axis 148. The switching lever 149 has a beat and portion 151 which abuts a stop face 152 on the pressure slide 132 of the pressure device 130 under the influence of a retaining spring 150, which takes the form of a tension spring and acts between the pressure slide 132 and the switching lever 149.

For setting each of the two pressure devices 129 and 130 to their engaged positions against the action of the return spring 128 a wire guide roller is rotatably journalled on each pressure slide 131 and 132 and the first wire 41 passes round each of these two wire guide rollers and urges the pressure devices towards their engaged positions, that is to say, when the first wire drum 39 is driven the first wire 41 tends to set the pressure devices 129 and 130 from their disengaged positions to their engaged positions. The said wire guide rollers are the two wire guide rollers 45 and 46, the wire guide roller 45 being rotatably journalled directly on the pressure slide 131 of the pressure device 129 and the wire guide roller 46 being journalled on the switching lever 149 which is in turn mounted on the pressure slide 132 of the pressure device 130.

The pressure devices 129 and 130 should not be moved from their disengaged positions to their engaged positions until the sliding members 21 and 22 are in their operating positions, because only then can the tape guide pins 19 and 20 be urged into the positioning grooves 126 and 127 by the pressure members 136 and 143. For this reason there is provided a disengageable latching device 153 which prevents a movement of each pressure device 129 and 130 to its engaged position when the sliding member is not in its operating position and which is disengaged when the sliding member is in its operating position. In the present case there is provided a single disengagable latching device 153 which is common to the two pressure devices 129 and 130 and which acts between the two pressure slides 131 and 132.

The latching device 153 comprises a leaf spring 154 which is secured at one end to the pressure slide 131 and whose free end 155 is bent through two right angles in opposite directions to form a shoulder 155 on the spring. This shoulder cooperates with a stop face 156 formed on the pressure slide 132, that is to say, in the non-released position of the latching device 153 the stop face 156 is held against the shoulder 155 of the leaf spring 154 by the tensile action of the wire 41 which passes around the wire guide rollers 45 and 46 and which is kept taut by the tension spring 67 which acts between the two wire drums 39 and 40, as stated previously.

In order to release the latching device when the slide members 21 and 22 are in their operating positions and actuating pin 157 is secured to the leaf spring 154, which pin, when the pressure devices 129 and 130 are in their disengaged positions, projects at its free end into the guide 23 for the sliding member 21. Just before the end of its movement from its rest position to its operating position the sliding member 21 strikes the free end of the actuating pin 157, and as the sliding member enters its operating position it sets the leaf spring 154 to a position in which the shoulder 155 of the leaf spring is lifted clear of the stop face 156 on the pressure slide 132 and thus releases the latching device 153. In FIG. 2 the position of the leaf spring is represented by dotted lines.

After the latching device 153 has been released, the pressure devices 129 and 130, as is to be described hereinafter, can be moved to their engaged positions by driving the first wire drum 39. When the pressure devices are in their engaged positions and the first wire drum 39 is driven further, the switching lever 149, on which the wire guide roller 46 is mounted, is urged into a switching position by the first wire 41 which is wound on the first wire drum and which passes around the wire guide roller 46, in which position the bent end portion 151 of the switching lever 149 is lifted clear of the stop face 152 of the pressure slide 132 against the action of the retaining spring 150. This switching position of the switching lever is shown in FIG. 2 and FIG. 7. As is apparent from FIG. 7, the switching lever 149 cooperates with the second switching device via a pin 158 mounted on the main contact 113 of the second switching device 112, the main contact 113 being connected to the first contact 114 of the second switching device 112 when the switching lever 149 is in its switching position. In this way the second switching device ensures that the synchronous motor is connected to the d.c. holding voltage when the switching lever is in its switching position, as can be seen in FIG. 8.

Thus, in addition to the supports which take the form of sliding members, the pressure devices also can be actuated by means of the wire drive arrangement, so that a separate drive for the pressure devices may be dispensed with. The provision of only one disengagable latching device for the two pressure devices results in a simple, cheap and compact construction. The connection of the synchronous motor to its d.c. holding voltage via a switching lever mounted on a pressure device has the advantage that the motor which is thus braked not only keeps the supports in their operating positions but also keeps the pressure devices in their engaged positions, so that separate retaining devices for retaining the pressure devices in their engaged positions may be dispensed with.

The operation of the apparatus described in the foregoing will now be explained in more detail. For moving the sliding members 21 and 22 from their rest positions to their operating positions the button 19 is actuated, so that the electromagnet 92 is energized and thus the a.c. supply voltage is applied to the synchronous motor in such a way that said motor is driven in the anti-clockwise direction. The gear wheel 75 is thereby rotated in the clockwise direction and via the driving projection 78, the coupling projection 86 of the coupling disc 84 and the coupling projection 82, the first wire drum 39 is driven in a clockwise direction, the second wire drum 40 also being driven via the spring 67. As a result of this the first wire 41 is wound onto the first wire drum 39 and consequently the first sliding member 21, on which via the coupling attachment 61 the first wire acts substantially in the direction of the movement of the sliding member from its rest position to its operating position, is pulled from its rest position to its operating position along the guide 23, the wire section 54 of the second wire 42, which via the coupling attachment 61 acts on the first sliding member substantially in the direction of movement of said member from its operating position to its rest position, being unwound from the transmission drum 57. At the same time the wire section 55 of the second wire is wound onto the transmission drum 58 and as a result of this the second sliding member 22, which is coupled to the first sliding member 21 via the second wire and on which via the coupling attachment 62 the wire section 55 of the second wire acts substantially in the direction of movement of the sliding member 22 from its rest position to its operating position, is also pulled from its rest position to its operating position along the guide 24, the third wire 43, which via the coupling attachment 62 acts on the second sliding member essentially in the direction of movement of this sliding member from its operating position to its rest position, being unwound from the second wire drum 40, which in this direction of rotation is driven via the spring 67. In this way the two sliding members 21 and 22, which are coupled to each other by the second wire 42, are pulled to their operating positions in a precisely coordinated and uniform manner, the tape guide pins 19 and 20 on the sliding members 21 and 22 pulling the tape 1 out of the cassette 10, wrapping it around the tape guide drum 2 and bringing it into contact with the magnetic heads 7, 8 and 9 and with the capstan shaft 5, from which the pressure roller 6 is at that time, of course disengaged. Obviously the reels in the cassette must be free to rotate. In this respect it is to be noted that the two sliding members, despite their different travels, reach their operating positions simultaneoulsy, because as stated previously the difference in travel has been compensated for with the aid of the transmission drums.

When the sliding members 21 and 22 reach their operating positions the coupling attachments 61 and 62 abut stops 159 and 160 provided in the guide 23 and 24 respectively, so that the coupling attachments and consequently the sliding members, which are coupled to said members with play via the coupling recesses 63 and 64, cannot be moved any further. In this situation the driven first wire drum 39 can no longer exert a pulling action on the second wire 42 and the third wire 43. However, the spring 67, which acts between the two wire drums 39 and 40, ensures that the second wire 42 and the third wire 43 remain sufficiently taut, so that said wires remain correctly positioned on the wire guide rollers. Moreover, when the operating position is reached the first sliding member 21 strikes the actuating pin 157 of the latching device 153 for the two pressure devices 129 and 130, so that the leaf spring 154 thereof is set to the position represented by the dotted lines in FIG. 2, in which position the latching device is disengaged. As already stated, the fact that the coupling attachment 61 is retained by the stop 159, the end of the first wire 41 connected to the coupling attachment 61 cannot be moved any further. However, as the first wire 41 is wound further onto the first wire drum 39 which is driven by the synchronous motor 72, the wire guide rollers 45 and 46, which are rotatably journalled on the pressure devices 129 and 130, which are no longer latched in their disengaged positions by the latching device 153, are pulled towards each other, the pressure devices thereby being moved to their engaged positions. This movement continues until in the engaged positions of the pressure devices the pressure members 136 and 143 engage the tape guide pins 19 and 20 and press said pins into the positioning grooves 126 and 127 of the positioning devices 118 and 119. In this respect it is to be noted that the tape guide pins on the sliding members can be pressed into the positioning grooves without being influenced or impeded by the wires of the wire drive arrangement which are acting under tension on the sliding members, because of the play between the coupling recesses of the sliding members and the coupling attachments.

Therefore, as soon as the pressure devices occupy their engaged positions, said devices cannot be moved any further. However, as the first wire 41 is wound further onto the first wire drum 39, the first wire exerts a tension on the wire guide roller 46 such that the switching lever on which the wire guide roller 46 is mounted is pivoted into its switching position, which is represented by full lines in FIG. 7, against the action of the retaining spring 150. In this switching position the switching lever 149 actuates the second switching device 112 so that the main contact 113 is electrically connected to the first contact 114 of the second switching device. As a result of this the synchronous motor 72 is disconnected from the a.c. drive voltage and connected to the d.c. holding voltage, so that the synchronous motor is braked. Thus, winding of the first wire 41 is discontinued and via the wire drive arrangement 38 the braked synchronous motor keeps the switching lever 149 in its switching position, the pressure devices 129 and 130 in their engaged positions, and the sliding members 21 and 22 for the tape guide pins 19 and 20 in their operating positions.

In this situation it is ensured that the tape guide pins 19 and 20 are retained in the positioning grooves 126 and 127. As can be seen in FIG. 2, the tape 1, which has been withdrawn from the cassette 10, then extends from the reel 11 via the guide roller 13, the tape guide pin 19, the magnetic head 9, the tape guide drum 2, the magnetic head 8, the magnetic head 7, the tape guide pin 20, the capstan 5, a further tape guide pin 161 and the guide roller 15 to the reel 12. If the reels 11 and 12, the capstan 5 and pressure roller 6, the rotatable magnetic heads 3 and 4 in the tape guide drum 2 and the magnetic heads 7, 8 and 9, are then put into operation, television signals and associated audio signals can be recorded on the tape or reproduced therefrom.

In order to return into the cassette the portion of the tape which has been withdrawn therefrom, the sliding member supporting the tape guide pins have to be moved from their operating positions to their rest positions. In order to start this movement the key 93 must be depressed, so that the electromagnet 92 is de-energized. As a result of this the synchronous motor 72 is disconnected from its d.c. holding voltage and, as already stated, is connected to the a.c. supply voltage in such a way that said motor is driven in the clockwise direction. As the d.c. holding voltage is disconnected, the tension exerted on the first wire 41 by the braked synchronous motor ceases, so that the switching lever 149 is reset from its switching position to its normal position by the retaining spring 150 and the pressure devices 129 and 130 are returned from their engaged positions to their disengaged positions under the influence of the return spring 128.

As the synchronous motor is connected to the a.c. supply voltage, as stated previously, said motor will be driven in the clockwise direction. Thus, the gear wheel 75 is driven in the anti-clockwise direction. Via the driving projection 79, the coupling projection 87 of the coupling disc 85 and the coupling projection 83 of the disc 81, which disc via the sleeve 66 is rigidly connected to the second wire drum 40, the rotation of the gear wheel 75 is transmitted to the second wire drum 40, so that this drum is also driven in the anti-clockwise direction. As a result of this the third wire 43 is wound onto the second wire drum 40, so that the second sliding member and the first sliding member, which is coupled to the second sliding member via the second wire, are moved from their operating positions to their rest positions the first wire 41 being unwound from the first wire drum 39. During this operation at least one of the two reels can be driven in the appropriate manner in order to return the tape into cassette, so as to take up the tape which has been withdrawn from the cassette.

As soon as the two sliding members 21 and 22 reach their rest positions, the sliding member 22 actuates the switch 116, so that this switch is opened and, as is apparent from the circuit diagram of FIG. 8, the a.c. supply voltage to the synchronous motor is interrupted. As the synchronous motor exhibits virtually no run-out, it stops at once so that the third wire 43 ceases to be wound onto the second wire drum 40 and the resulting movements of the sliding members are also stopped. Consequently, the rest positions of the sliding members are defined by the position of the switch 116, so that separate stops may be dispensed with. The rest positions of the sliding members, as is apparent from FIG. 1, have been selected so that the tape guide pins 19 and 20 are slightly lifted off the tape when the sliding members 21 and 22 are in their rest positions. In this way it is ensured that the risk of the tape being damaged by the tape guide pins when a cassette is removed from the apparatus is avoided and that when a cassette is inserted into the apparatus it is ensured that the tape guide pins engage behind the tape, which is essential for a correct withdrawal of the tape from the cassette.

As is apparent from the foregoing description, a well-coordinated movement of the tape guide pins is ensured by the joint movement of the supports for the tape guide pins, which supports are arranged so as to be movable in the apparatus independently of each other but are coupled to each other by means of a wire. As only one wire can be wound on each wire drum, this winding can be effected very uniformly, so that the supports with the tape guide pins also move very uniformly and smoothly, which results in a particularly smooth and gentle withdrawal of the tape from the cassette and return of the tape into the cassette.

The construction of the supports for the tape guide pins as sliding members and the use of the guides for the sliding members as guides also for the wires which act on the sliding members, is particularly space-saving, because the wires then require no separate space for their movement when moving the sliding members, is required, which is advantageous in respect of the size of the apparatus. Moreover, because of their flexibility, the wires can be simply adapted to any geometry of the guides. Owing to the coaxial arrangement of the two wire drums the desired result is obtained in a space-saving and cost-saving manner using only one drive arrangement for the wire drums. Another space-saving and cost-saving factor is that the wire drive arrangement for moving the support for the tape guide pins is also employed for the movement of the pressure devices for the tape guide pins. The construction of the pressure devices and the latching device for said devices may also be regarded as simple and space-saving. Finally, the connection of the synchronous motor to a d.c. holding voltage by means of a switching lever, which is also actuated by the wire drive arrangement and which is moved only when it is ensured that all apparatus parts to be actuated are in their operating positions, can also be regarded as advantageous, because this provides a high reliability of operation. In respect of a simple assembly and dismantling and also in respect of an unimpeded positioning of the tape guide pins on the supports, it is also advantageous that the wire act on the supports via detachable couplings which are capable of some lost motion.

The recording and/or reproducing apparatus of FIGS. 9 and 10 comprises two levers 162 and 163 as supports for the tape guides, which levers are pivotable between their rest positions and their operating positions about spindles 164 and 165 respectively, which are rigidly mounted in the apparatus. The levers 162 and 163 carry rotatable tape guide rollers 166 and 167 respectively, which function as tape guides. The rest positions of the levers are shown in FIG. 9 and the operating positions in FIG. 10.

For moving the two levers 162 and 163 there is again provided a wire drive arrangement 38, which comprises two rotatable wire drums 39 and 40, which in this case are not arranged coaxially, as in the apparatus shown in FIGS. 1 to 8, but are spaced from each other transversely of their axes. Furthermore, the wire drive arrangement 38 again comprises a first wire 41, a second wire 42, and a third wire 43, the first wire 41 passing from the first wire drum 39, to which it is connected, via a stationary oval first wire guide 168 to the end 169 of the first lever 162 which carries the tape guide roller 166, and acting on said lever substantially in the direction of movement of said lever from its rest position to its operating position. The second wire 42, which acts on the first lever 162 substantially in the direction of movement of said lever from its operating position to its rest position, passes from the end 169 of the first lever 162 via a stationary oval second wire guide 170 and a stationary oval third wire guide 171 to the end 172 of the second lever 163 which carries the tape guide roller 166. The second wire 42 acts on the second lever 163 substantially in the direction of movement of said lever from its rest position to its operating position. The third wire 43, which acts on the second lever 163 substantially in the direction of movement of said lever from its operating position to its rest position, passes from the end 172 of the lever 163 via a stationary oval fourth wire guide 173 to the second wire drum 40 and is connected thereto. The oval wire guides have circumferential grooves in which the wires are guided. In the present case the wires 41, 42 and 43 are constituted by a continuous wire which extends between the two wire drums 39 and 40 and is attached to the levers in a schematically represented manner.

For driving the two wire drums 39 and 40 there are provided two d.c. motors 174 and 175, respectively, which are each arranged coaxially with the wire drums 39 and 40. For driving the first wire drum 39 to move the levers 162 and 163 from their rest positions to their operating positions, the first motor 174 can be driven in the clockwise direction, and for driving the second wire drum 40 to move the levers 162 and 163 from their operating positions to their rest positions, the second motor can also be driven in the clockwise direction. It is to be noted furthermore that in this apparatus the two supports, in the form of the levers 162 and 163, for the tape guide rollers have the same travel between their rest positions and their operating positions.

For driving the first motor 174 to move the levers from their rest positions to their operating positions, said motor can be connected to a d.c. supply voltage V via a switch 176. The switch 176 can be closed by the button 90 for starting the movement of the levers from their rest positions to their operating positions. For driving the motor 175 to move the levers from their operating positions to their rest positions, this motor can be connected to the d.c. supply voltage V via a switch 177. The switch 177 can be closed by means of the button 93 for starting the movement of the levers from their operating positions to their rest positions. Again the two buttons, which are automatically retained in their on-positions, are constructed so that when one of the two buttons 90 or 93 is actuated the other button, if actuated, is released, as is symbolically represented by the broken line 94.

For switching off the first motor 174 after the two levers 162 and 163 have been moved from their rest positions to their operating positions, there is provided a switch 178 included in the circuit of the first motor 174, which switch can be actuated in the operating position of the first lever 162 and is closed when the lever 162 is not in its operating position, in which case the motors 174 can be driven, and is open when the lever 162 is in its operating position, in which case the drive of the motor 174 is interrupted. For switching off the second motor 175 after the two levers 162 and 163 have been moved from their operating positions to their rest positions, there is provided a switch 179 which can be actuated by the second lever 163 and which is included in the circuit of the second motor 175, which switch is closed when the lever 163 is not in its rest position, in which case the motor 175 can be driven, and is open when the lever is in its rest position, in which case the drive of the motor 175 is interrupted.

For holding the two wire drums 39 and 40 stationary after each movement of the levers 162 and 163 supporting the tape guide rollers 166 and 167, there is provided a disengagable latching device 180 and 181 for each wire drum. Each of the two latching devices 180 and 181 comprises a pivotable latch 184 and 185 respectively, which is movable by means of an electromagnet 182 and 183 respectively. The two latches are adapted to cooperate with teeth 186 and 187 on the two wire drums 39 and 40 respectively, the latches 184 and 185 engaging the teeth 186 and 187 with their hooked free ends 188 and 189 when the electromagnets 182 and 183 are energized, as shown in full lines in FIGS. 9 and 10, and the free ends of the latches being disengaged from the respective teeth when the electromagnets are not energized, as shown in dotted lines in FIGS. 9 and 10.

The two electromagnets 182 and 183 are each connected to earth with one terminal, the two other terminals being interconnected at a terminal 190. Via the parallel connection of two series-connected switches 191 and 192 and 193 and 194 respectively, the d.c. supply voltage V can be applied to the terminal 190. The two switches 191 and 193, which are open in their rest position, can be actuated by the second lever 163. The switch 191 is closed by the second lever 163 when the lever 163 is in its rest position, the electromagnets 182 and 183 then being energized via the switch 192 and the switch 191, and the latches 184 and 185 being in engagement with the teeth 186 and 187 in order to hold the wire drums 39 and 40. The switch 193 is closed by the second lever 163, if said lever is in its operating position, the electromagnets 182 and 183 then being energized via the switch 194 and the switch 193, and the latches 184 and 185 engaging with the teeth 186 and 187 of the wire drums 39 and 40 in order to hold said drums. The switch 192, which is closed in its rest position, can be actuated by the button 90 in order to start the movements of the levers 162 and 163 from their rest positions to their operating positions, and the switch 194, which is also closed in its rest position, can be actuated by the button 93 in order to start the movements of the levers from their operating positions to their rest positions, each button 90 or 93 opening the switch 192 or 194 respectively which is actuated thereby. Upon actuation of each of the two buttons for starting the movements of the levers 162 and 163 the circuit of the electromagnets 182 and 183 is interrupted, so that the latches 184 and 185 are disengaged from the teeth 186 and 187 and the wire drums 39 and 40 can again be driven by their motors 174 and 175.

To move the levers 162 and 163 supporting the tape guide rollers 166 and 167 from their rest positions shown in FIG. 9 to their operating positions shown in FIG. 10, so that the tape guide rollers 166 and 167 will withdraw the tape 1 from the cassette 10 and wrap it around the tape guide drum 2, the button 90 is actuated. As a result of this the switch 192 is opened, so that the d.c. supply voltage V to the electromagnets 182 and 183 is interrupted, because the switch 193 is also opened. As the electromagnets 182 and 183 are then no longer energized, the latches 184 and 185 are disengaged from the wire drums 39 and 40, so that said drums can rotate. By actuation of the button 90 the switch 176 is also closed, so that the first motor 174 is driven in the clockwise direction. The first motor 174 drives the first wire drum 39 in the clockwise direction, so that the first wire 41 is wound onto the first wire drum 39. The first lever 162, on which the first wire acts, is then pulled from its rest position to its operating position. As the second lever 163 is coupled to the first lever 162 via the second wire 42, the second lever 163 also is pulled from its rest position to its operating position. The third wire 43, which acts on the second lever 163, is then unwound from the second wire drum 40, which can then rotate substantially freely, because the second motor 175 is not braked. As soon as the two levers 162 and 163 have left their rest positions, the switch 179 is closed and the switch 191 is opened. As soon as the levers reach their operating positions switch 178 is opened by the first lever 162 so that the first motor 174 is stopped, and switch 193 is closed by the second lever 163 so that the electromagnets 182 and 183 are energized. The first wire drum 39 is then no longer driven by the motor 164 and the two wire drums 39 and 40 are held by the latches 184 and 185 which are actuated by means of the electromagnets 182 and 183. Thus, it is also ensured that the levers 162 and 163 are kept in their operating positions via the wires 41, 42 and 43 which extend between the latched wire drums 39 and 40, which operating positions are thus defined by the arrangement of the switches 178 and 193.

To move the levers 162 and 163 from their operating positions shown in FIG. 10 to their rest positions shown in FIG. 9, so as to enable the tape 1 to be returned into the cassette 10, the button 93 is actuated. As a result of this, the switch 194 is opened. Since, as stated previously, the switch 191 is in its open switching position, the d.c. supply voltage V is disconnected from the electromagnets 182 and 183 when the switch 194 is opened, so that the latches 184 and 185 are released to allow the wire drums 39 and 40 to rotate. Moreover, switch 177 is closed as a result of the actuation of the button 93, so that the second motor 175 is connected to the d.c. supply voltage and is thus driven in the clockwise direction. The second motor 175 drives the second wire drum 40 in the clockwise direction also. The third wire 43 is then wound onto the second wire drum 40, said wire 43, which acts on the second lever 163, then moving said lever from its operating positions to its rest position. During this movement the first lever 162, which is coupled to the second lever 163 via the second wire 42, is also moved from its operating position to its rest position, the first wire 41, which acts on the first lever 162, being unwound from the first wire drum 39. The first wire drum 39 then rotates substantially without being braked, because the first motor 174 is not braked. As soon as the two levers 162 and 163 have left their operating positions, the switch 178 is closed and switch 193 is opened. As soon as the two levers 162 and 163 occupy their rest positions, the switch 179 is closed so that the second motor 175 and thus the second wire drum 40 is stopped, and the switch 191 is closed so that the electromagnets 182 and 183 are energized and the wire drums 39 and 40 are held by means of the latches 184 and 185. In this way it is ensured that the levers 162 and 163 are maintained in their rest positions, which are defined by the positions of the switches 179 and 191.

In this embodiment the coupling of the two levers, which are essentially pivotable independently of each other, by means of a wire ensures a precisely coordinated movement of the levers and thus of the tape guide rollers. Since again only one wire is wound on each wire drum, winding can be effected uniformly and smoothly, which results in a very smooth and uniform movement of the tape guide rollers. Thus, the tape is not subjected to non-uniform loads. By providing two separate drive means for the two wire drums, which are spaced from each other transversely of their axes, these drive means may be of very simple construction. Holding the wire drums by means of switchable latches is advantageous, because a comparatively large effort is required only for switching the latches and not for retaining the latches in their engaged positions, in which they are engaged with the wire drums. This is advantageous for a minimal power consumption.

Obviously the invention is not limited to the two embodiments described in the foregoing, because a series of modifications to these embodiments is possible. This is possible in respect of, for example, the construction of the supports and the tape guides arranged on the supports. Furthermore, it is also possible in respect of the drive means for the two wire drums, as well as the means for holding the wire drums stationary after the supports have been moved.

What is claimed is:

1. A recording and/or reproducing apparatus for a record carrier in the form of a tape which is accommodated in a cassette which comprises at least one opening for the withdrawal of a portion of the record carrier from said cassette and which cassette can be supported on the apparatus, which apparatus is provided with a tape guide drum around whose circumferential surface can be wrapped the portion of the record carrier which has been withdrawn from the cassette, and with a tape guide device which is adapted to withdraw a portion of the record carrier from the cassette and wrap said portion of the record carrier around the tape guide drum, which tape guide device comprises two substantially cylindrical tape guides which are each arranged on an associated one of two movable supports in the apparatus, which supports are movable between a rest position, in which the tape guides engage behind the record carrier contained in the cassette at the location of the opening therein, and an operating position, in which the tape guides keep the portion of the record carrier which is moved by the tape guides when the supports are moved from their rest positions to their operating positions, wrapped around the tape guide drum, there being provided a wire drive arrangement for moving the two supports, which arrangement comprises a rotatable wire drum and two wires which each act on one of the two supports substantially in the direction of movement of the support from its rest position to its operating position and one of which passes to the rotatable wire drum via a wire guide, so as to be wound onto said wire drum, characterized in that the wire drive arrangement comprises two rotatable wire drums for winding in one wire each, the first wire which acts on a first one of the two supports substantially in the direction of movement of said support from its rest position to its operating position passing to a first one of the two wire drums, in that the second wire which acts on the second one of the two supports substantially in the direction of movement of said support from its rest position to its operating position passes to the first support and acts on this support substantially in the direction of movement thereof from its operating position to its rest position, in that a third wire passes from the second of the two wire drums to the second support and acts on this support substantially in the direction of movement thereof from its operating position to its rest position, and in that for moving the two supports from their rest positions to their operating positions the first wire drum can be driven and for moving them from their operating positions to their rest positions the second wire drum can be driven.

2. An apparatus as claimed in claim 1, characterized in that each of the two supports takes the form of a sliding member and is movably guided along a guide between its rest position and its operating position, and in that the wire which acts on the first support passes along the guide for the first support and the wire which acts on the second support passes along the guide for the second support.

3. An apparatus as claimed in claim 1, characterized in that the second wire in its path between the two supports is divided so as to form two separate wire sections, in that a pair of rotatable transmission drums is provided at the location of this division, which pair comprises two drums of different diameter coaxial with each other and are connected to each other and in that the two wire sections each run onto an associated one of the two transmission drums and is connected thereto, one of the wire sections running onto the associated transmission drum in the clockwise direction and the other in the counterclockwise direction, and in order to obtain different travels for the two supports the wire section which passes to the support having a greater travel is connected to the transmission drum having a greater diameter, and the wire section which passes to the support having a smaller travel is connected to the transmission drum having a smaller diameter.

4. An apparatus as claimed in any of the preceding claims 1, 2, or 3, characterized in that the two wire drums are journalled in the apparatus so as to be coaxial with each other and are rotatable relative to each other, in that the first wire and the third wire each run onto an associated one of the two wire drums and is connected thereto, one of these two wires running onto the associated wire drum in the clockwise direction and the other in the counterclockwise direction, in that for winding in the wires connected to the two wire drums said drums can be driven in opposite directions of rotation, and in that there is provided a spring which acts between the two wire drums and urges the two wire drums relative to each other in opposite directions of rotation.

5. An apparatus as claimed in claim 4, characterized in that the spring takes the form of a flat spiral spring which is substantially coaxial with the wire drums.

6. An apparatus as claimed in claims 4, characterized in that for driving the two coaxial wire drums there is provided a common motor drive arrangement whose direction of rotation is reversible.

7. An apparatus as claimed in claim 6, characterized in that the drive arrangement comprises a synchronous motor whose direction of rotation is reversible, which motor drives a rotatably journalled drive member which is coaxial with the two wire drums, and in that between the drive member and each of the two wire drums there is arranged a respective one of two unidirectional coupling devices which, depending on the direction of rotation of the synchronous motor, establish a driving connection between the drive member driven by the synchronous motor and one or the other of the two wire drums.

8. An apparatus as claimed in claim 7, characterized in that each of the two unidirectional coupling devices comprises a driving projection which projects from the drive member, a coupling projection which projects from a disc which is rigidly connected to the respective wire drum, and a coupling disc which is coaxial with the drive member and which is journalled so as to be rotatable relative to said drive member and the wire drums, which coupling disc comprises a coupling projection for coupling said driving projection to the coupling projection on the disc which is rigidly connected to the respective wire drum.

9. An apparatus as claimed in claim 7, characterized in that for the synchronous motor there is provided a control circuit, which comprises a manually-actuated first switching device which can be switched between two switching positions, for connecting the synchronous motor to an a.c. supply voltage, in one of which switching positions the synchronous motor rotates in a first direction for driving the first wire drum so as to move the supports from their rest positions to their operating positions, and in the other of which switching positions the synchronous motor rotates in a second direction, which is opposite to the first direction, for driving the second wire drum, so as to move the supports from their operating positions to their rest positions, the control circuit further comprising a second switching device which can be actuated when the supports are in their operating positions, which device disconnects the synchronous motor from the a.c. supply voltage and connects it to a d.c. holding voltage when the supports are in their operating positions.

10. An apparatus as claimed in claim 9, characterized in that for positioning the two tape guides when the supports are in their operating positions there is provided one positioning device for each tape guide and when the supports are in their operating poisitions the tape guides are each urged into the respective positioning device by means of a separate pressure device which is movable against the action of a return spring from a disengaged position to an engaged position, in that for moving each pressure device to its engaged position a wire guide roller is rotatably journalled on each pressure device, in that the first wire passes round each wire guide roller so as to urge the respective pressure device in the direction of its engaged position, and in that for each pressure device there is provided a separate disengagabe latching device which prevents the pressure device from moving to its engaged position when the respective support is out of its operating position and which is disengaged when the respective support is in its operating position, and further characterized in that one of the two pressure devices comprises a switching lever which is pivotably journalled on said device, which lever under the influence of a retaining spring is retained against a stop on said one of the pressure devices and on which lever the wire guide roller on said one of the pressure devices is rotatably journalled, the switching lever, when said one of the pressure devices is in its engaged position, being kept in a switching position by cooperation between the first wire and said wire guide roller in which position the switching lever is disengaged from the stop against the action of the retaining spring and in that the switching lever is coupled to the second switching device of the control circuit for the synchronous motor, which when the switching lever is in its switching position keeps the synchronous motor connected to its d.c. holding voltage.

11. An apparatus as claimed in claim 1, characterized in that for positioning the two tape guides when the supports are in their operating positions there is provided one positioning device for each tape guide and when the supports are in their operating positions the tape guides are each urged into the respective positioning device by means of a separate pressure device which is movable against the action of a return spring from a disengaged position to an engaged position, in that for moving each pressure device to its engaged position a wire guide roller is rotatably journalled on each pressure device, in that the first wire passes round each wire guide roller so as to urge the respective pressure device in the direction of its engaged position, and in that for each pressure device there is provided a separate disengagable latching device which prevents the pressure device from moving to its engaged position when the respective support is out of its operating position and which is disengaged when the respective support is in its operating position.

12. An apparatus as claimed in claim 11, characterized in that the two pressure devices each comprise a pressure slide, the two slides being movable parallel to each other, and on each slide an essentially U-shaped pressure member being pivotably journalled for cooperation with the respective tape guide, and in that for the two pressure devices there is provided a single disengagable latching device which is common to the two pressure devices and acts between the two pressure slides.

13. An apparatus as claimed in claim 1, characterized in that the wires are coupled to the supports by detachable coupling means.

14. An apparatus as claimed in claim 13, characterized in that for freely positioning each tape guide when the associated support is in its operating position the detachable coupling means between each wire and the respective support has some lost motion relative to the support.

* * * * *